United States Patent
Hetzler et al.

(10) Patent No.: US 9,990,325 B2
(45) Date of Patent: Jun. 5, 2018

(54) UNIVERSAL SERIAL BUS (USB) FILTER HUB MALICIOUS CODE PREVENTION SYSTEM

(71) Applicant: International Business Machines Corporation, Armonk, NY (US)

(72) Inventors: Steven R. Hetzler, Los Altos, CA (US); Daniel F. Smith, Felton, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 347 days.

(21) Appl. No.: 14/683,469

(22) Filed: Apr. 10, 2015

(65) Prior Publication Data
US 2016/0299865 A1     Oct. 13, 2016

(51) Int. Cl.
| | |
|---|---|
| *G06F 11/00* | (2006.01) |
| *G06F 13/40* | (2006.01) |
| *G06F 13/42* | (2006.01) |
| *G06F 21/56* | (2013.01) |
| *G06F 3/02* | (2006.01) |
| *G06F 12/14* | (2006.01) |

(52) U.S. Cl.
CPC ........ *G06F 13/4068* (2013.01); *G06F 3/0227* (2013.01); *G06F 13/4282* (2013.01); *G06F 21/56* (2013.01); *G06F 21/567* (2013.01); *G06F 12/14* (2013.01)

(58) Field of Classification Search
CPC ........ G06F 3/0227; G06F 21/34; G06F 12/14; G06F 21/56; G06F 21/567
See application file for complete search history.

(56) References Cited

U.S. PATENT DOCUMENTS 7,376,732 B2 * 5/2008 Sample ................ G06F 21/55
709/203
8,560,864 B2 * 10/2013 Chang ................ G06F 21/567
713/193
(Continued)

FOREIGN PATENT DOCUMENTS

EP       2136310 A1    12/2009

OTHER PUBLICATIONS

IP.com, "USB Flash Disk Device and Method," Authors Disclosed Anonymously; IP.com No. 000147013; Mar. 4, 2007; pp. 1-20.
(Continued)

*Primary Examiner* — Tammara Peyton
(74) *Attorney, Agent, or Firm* — Cantor Colburn LLP; Bryan W Butler (57) ABSTRACT

Embodiments relate a universal serial bus (USB) filter hub. An aspect includes receiving, by the USB filter hub that is in communication with a host computer system, a connection from a USB device at a USB port of the USB filter hub. Another aspect includes determining, by the USB filter hub, a type of the USB device. Another aspect includes determining whether the type of the USB device is valid. Yet another aspect includes, based on determining that the type of the USB device is valid, filtering commands that are communicated between the USB device and the host computer system via the USB filter hub based on a predetermined command set corresponding to the determined type of the USB device.

13 Claims, 5 Drawing Sheets

(56) References Cited

U.S. PATENT DOCUMENTS

| | | | |
|---|---|---|---|
| 8,646,082 B2* | 2/2014 | Lomont | G06F 21/85 |
| | | | 726/24 |
| 2007/0073940 A1* | 3/2007 | Patterson | G06F 3/0227 |
| | | | 710/62 |
| 2007/0198753 A1 | 8/2007 | Hamid | |
| 2010/0262863 A1 | 10/2010 | Hess | |
| 2011/0088093 A1* | 4/2011 | Kang | G06F 21/567 |
| | | | 726/22 |
| 2011/0265156 A1* | 10/2011 | Bombay | G06F 21/34 |
| | | | 726/5 |

OTHER PUBLICATIONS

L. Jin-Shan, et al., "Security Monitoring Technology of USB Storage Device Based on Driver Layer," Computer Engineering, vol. 34, No. 8, Apr. 2008; pp. 255-257.

S. Li, et al., "Research and Application of USB Filter Driver Based on Windows Kernel," Third International Symposium on Intelligent Information Technology and Security Informatics; 2010 IEEE; pp. 438-441.

\* cited by examiner

UNIVERSAL SERIAL BUS (USB) FILTER HUB MALICIOUS CODE PREVENTION SYSTEM

BACKGROUND

The present invention relates generally to computer systems, and more specifically, to a universal serial bus (USB) filter hub for a computer system.

USB is a serial bus standard that is used to interface various types of devices to a host computer system. USB can connect computer peripherals such as memory devices, mouse devices, keyboards, personal digital assistants (PDAs), gamepads and joysticks, scanners, digital cameras, and printers, to the host computer system. USB allows peripherals to be connected using a single standardized interface socket, improving plug-and-play capabilities by allowing devices to be connected to and disconnected from the host computer system without rebooting the host computer system.

SUMMARY

Embodiments include a method, system, and computer program product for a universal serial bus (USB) filter hub. An aspect includes receiving, by the USB filter hub that is in communication with a host computer system, a connection from a USB device at a USB port of the USB filter hub. Another aspect includes determining, by the USB filter hub, a type of the USB device. Another aspect includes determining whether the type of the USB device is valid. Yet another aspect includes, based on determining that the type of the USB device is valid, filtering commands that are communicated between the USB device and the host computer system via the USB filter hub based on a predetermined command set corresponding to the determined type of the USB device.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of a USB filter hub are provided, with exemplary embodiments being discussed below in detail. USB devices may have various security flaws (e.g., BadUSB) that allows malicious code to modify the USB device basic input/output system (BIOS), and execute arbitrary code on an attached host computer system. For example, a USB memory device may register as a USB keyboard to the operating system (OS) in the host computer system, thereby gaining the ability to enter arbitrary commands to the host computer system. In another example, a USB device may spoof a network adapter and allow malicious connections to the host computer system. A USB device may also contain BIOS-resident viruses in that cannot be scanned. In order to protect a computer system from such malicious USB devices, a USB filter hub acts as an interface between USB devices and the host computer system. The USB filter hub may detect malicious devices, and also restrict registration and command types that may be communicated to the host computer system by any USB device. The USB filter hub can secure and check all USB legacy devices without requiring that the USB devices support signed firmware; rather, signed firmware may be supported on the USB filter hub itself.

The USB filter hub may be a physical device that is located externally to the host computer system, between the host computer system and any USB devices that are connected to the host computer system in some embodiments. For example, the USB filter hub may have a USB adapter that plugs into a USB port of the host computer system, and a plurality of USB ports into which USB devices are plugged. In other embodiments, the USB filter hub may be located internally to the host computer system, and act to filter connections to a plurality of USB ports of the host computer system.

Figure 1:
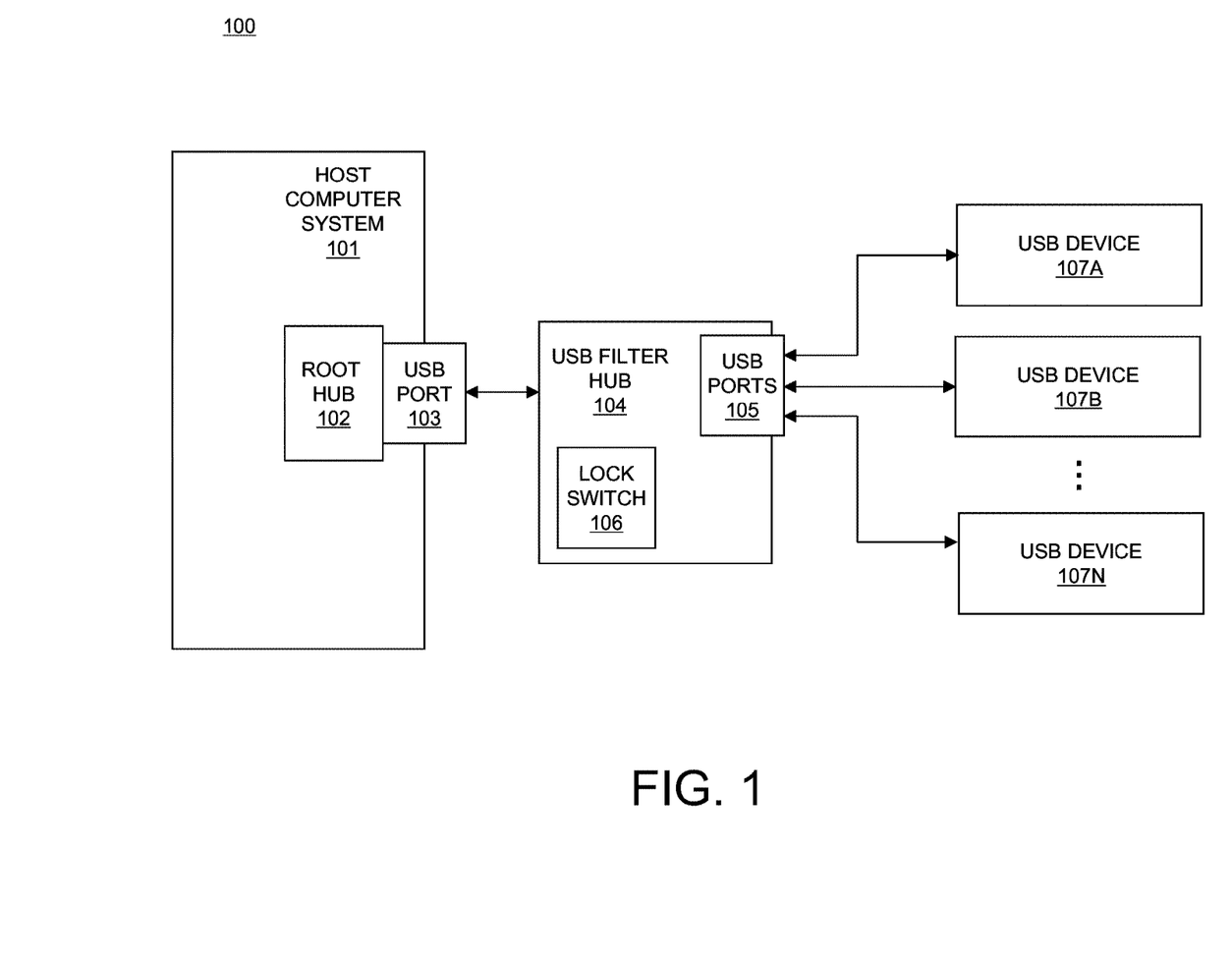
FIG. 1 depicts a USB filter hub in accordance with an embodiment.

FIG. 1 illustrates an embodiment of a system 100 comprising an external USB filter hub in accordance with an embodiment. System 100 includes a host computer system 101, which includes a root hub 102 and a USB port 103. As shown in FIG. 1, USB filter hub 104 is connected to host computer system 101 via USB port 103; however, this is shown for illustrative purposes only, a USB filter hub may be connected to a host computer system such as host computer system 101 in any appropriate manner in various embodiments. Host computer system 101 may include any appropriate number of USB ports such as USB port 103; any additional USB ports in host computer system 101 may be disabled by the connecting of USB filter hub 104 to the host computer system 101, such that all USB connections to the host computer system 101 are made via the USB filter hub 104. USB filter hub 104 includes a lock switch 106, and a plurality of USB ports 105, which may connect to any appropriate number and type of USB devices 107A-N. All communications between USB devices 107A-N and host computer system 101 are transmitted via the USB filter hub 104. FIG. 1 is shown for illustrative purposes only; for example, USB filter hub may be located internally to the host computer system in some embodiments. Further, a USB filter hub may be connected to a host computer system in any appropriate manner. Any appropriate number of USB devices may be connected to a USB filter hub.

The USB filter hub 104 may filter the USB protocol to ensure that only proper device commands, based on the type of the USB device, are forwarded to the host computer system 101. Command filtering can be applied by the USB filter hub 104 to any type of USB device, including but not limited to network cards, mice, keyboards, printers, or scanners. For example, for a USB device 107A comprising a storage device, the USB filter hub 104 does not allow any non-storage commands from the USB device to be sent to the host computer system 101. The USB filter hub 104 may also provide a generic interface which isolates the specifics of the USB devices 107A-N from the host computer system 101. For example, in some embodiments, the USB filter hub 104 reports all storage devices to the host computer system as generic for their type (e.g., flash, optical drive, HDD), thus avoiding having the OS on the host computer system 101 install a specific driver for any USB device. In such an embodiment, the driver for the USB filter hub 104 on the host computer system includes support for these generic devices. Therefore, the host computer system 101 will not search the web for new drivers for any USB device, so that compromised device drivers are avoided. In various embodiments, instead of USB port 103 as shown in FIG. 1, the interface between the USB filter hub 104 and the host computer system 101 may be any other appropriate type of interface, for example, a storage interface, such as an enterprise serial advanced technology attachment (eSATA). In such embodiments, the USB filter hub rejects all non-storage devices.

The USB filter hub 104 may also require that the device type of each USB device 107A-N be static, and detect any aberrant behavior regarding device type registration. In some embodiments, a whitelist may be implemented on the host computer system 101 that lists permissible USB device types. In some embodiments, the whitelist may specify a number of devices of different types that are permitted (for example, only 1 keyboard). The whitelist may also allow a single USB device to register as multiple device types (for example, a single USB device 107A that is both camera and a storage device). In some embodiments, the USB filter hub 104 may also cause the host computer system 101 to ask the user for confirmation that a USB device of a specific type was plugged in.

Further, a malicious USB memory device may attempt to deregister itself and then re-register as, for example, keyboard, by mimicking an unplugging of the USB memory device and subsequent plugging in of a new device into the same port, without any actual physical unplugging/plugging of the USB memory device. The USB filter hub 104 may detect such a deregistration attempt and flag the USB memory device as a malicious device. Non-permissible actions by a USB device can be flagged, and the USB filter hub can indicate that the USB device is a malicious USB device based on the flagging. The indication can be visual (e.g., a flashing light), audio, and/or a message sent to the host computer system in various embodiments. The USB filter hub 104 also stops forwarding communications to/from a malicious USB device. A lock switch 106 on the USB filter hub may also be used to disallow currently connected devices from changing their registration type, such that no new devices will be recognized.

In some embodiments, the USB filter hub 104 also determines whether there is any boot-level rootkit activity on a USB device. In some embodiments, the USB filter hub 104 does not allow BIOS updates to the host computer system 101 from any USB device 107A-N. The USB filter hub 104 may also disallow booting the host computer system 101 from any USB device 107A-N, or may limit boot activity to whitelisted devices. A physical lock switch 106 may also be provided on the USB filter hub 104 that the user must toggle in order to explicitly enable booting from a USB device 107A. To protect against file system attacks on the host computer system 101, the USB filter hub 104 may encrypt the block storage on the host computer system 101 with a corporate or personal key. In various embodiments, lock switch 106 may enable booting for all of the USB ports 105, or the USB filter hub 104 may include a respective lock switch such as lock switch 106 for each individual USB port of USB ports 105. In some embodiments, the lock switch 106 is a physical lock switch. The lock switch 106 may also comprise multiple lock switches (for example, one for each of the ports) in some embodiments. In further embodiments, the lock switch 106 comprises a software component, such that the user may set and unset the various settings of the lock switch in software via host computer system 101.

The USB filter hub 104 may be preloaded with various signed credentials, such as signed wi-fi credentials, and signed ethernet and routing tables; therefore, USB devices 107A-N that are plugged into the hub do not require their own signed credentials. However, updating of USB firmware on a USB device 107A may be allowed through the USB filter hub 104 in some embodiments. The USB filter hub 104 may require that the USB device firmware be signed. The signed firmware may be forwarded to the USB filter hub 104, which verifies the signature, and then updates the USB device 107A directly. Non-signed updates or direct updates to a USB device 107A-N from the host computer system 101 may not be permitted.

Software drivers on the host computer system 101 may shut down all other USB ports 103, except one or more USB ports that are directly attached to the USB filter hub 104. In some embodiments, the USB filter hub 104 driver may replace the USB driver on the host computer system 101, locking out any other USB devices that are directly attached to the host computer system 101. If two USB filter hubs are attached to a single host computer system 101, in some embodiments, both USB filter hubs may only be enabled if they are both whitelisted. Physical security of the USB ports 103 on the host computer system 101 may be enhanced using a custom cable host connector, which might be potted into existing USB ports, preventing direct attachment of USB devices other than the USB filter hub 104 to host computer system 101, in some embodiments.

Figure 2:
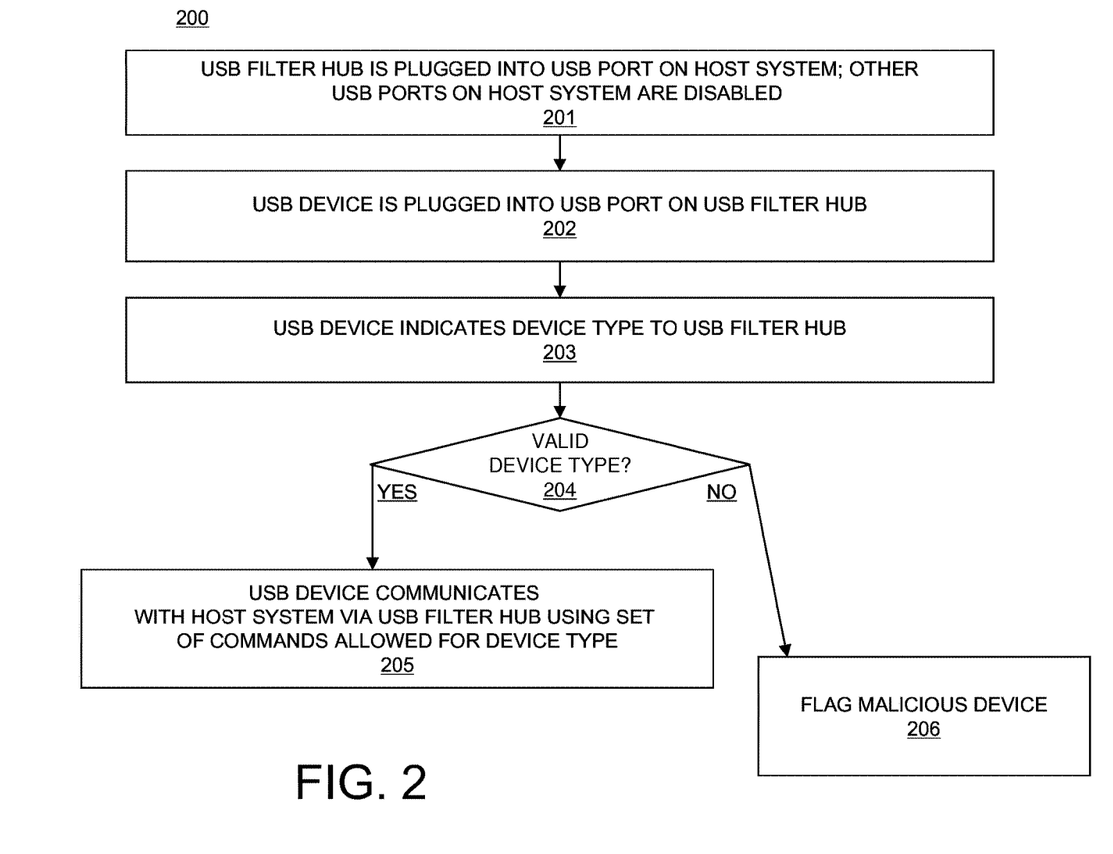
FIG. 2 depicts a process flow for use of a USB filter hub in accordance with an embodiment.

FIG. 2 illustrates an embodiment of a process 200 for use by a USB filter hub in accordance with an embodiment. FIG. 2 is discussed with respect to FIG. 1. First, in block 201, the USB filter hub 104 is plugged into a USB port 103 of a host computer system 101; any other USB ports on the host computer system 101 may be disabled based by root hub 102 based on the plugging in of the USB filter hub 104 into the USB port 103. Then, in block 202, a USB device (for example, USB device 107A) is plugged into a USB port of USB ports 105 on the USB filter hub 104. Then, in block 203, the USB device 107A is powered up based on the plugging into the USB filter hub 104, and the USB device 107A attempts to register and indicate its device type to the USB filter hub 104. The USB device 107A may be any appropriate type of USB device, including but not limited to a storage device, a keyboard, a mouse, a scanner, and a camera.

Then, in block 204, the USB filter hub 104 determines whether the device type that was indicated by the USB device 107A in block 203 is a valid device type. In some embodiments of block 204, the USB filter hub 104 may cause the host computer system 101 to display a prompt to the user, asking the user to confirm whether they have just connected a device of the type indicated in block 203 to the USB filter hub 104. If the user does not confirm the device type, the USB device 107A is determined to be malicious. In some embodiments, a whitelist of allowable devices may be maintained on, for example, host computer system 101 or USB filter hub 104. In some embodiments, the whitelist may contain a number of allowed devices of each type. For example, the whitelist may indicate that only one keyboard may be connected to the host computer system 101 at the same time; therefore, if USB device 107A attempts to register as a keyboard when there is another keyboard attached to the host computer system 101, the device type is determined to be invalid. In further embodiments, only storage type devices may be connected to the USB filter hub 104; an attempt to register as another type of device is not recognized.

If it is determined in block 204 that the device type indicated by the USB device 107A is valid, flow proceeds to block 205, in which the USB device 107A communicates with the host computer system 101 via the USB filter hub 104. The USB filter hub 104 may restrict the types of commands that are transmitted from the USB device 107A to the host computer system 101 based on the device type. For example, a USB storage device may only use a predetermined set of storage commands. Any commands from the USB device 107A that are not part of the predetermined set of commands for the device type are intercepted by USB filter hub 104 and are not transmitted to the host computer system 101. If it is determined in block 204 that the device type is not a valid device type, flow proceeds to block 206, and the USB device 107A is flagged as a malicious device. Communications between a malicious device and host computer system 101 are blocked by the USB filter hub 104. An indication of the malicious device may be provided to the user in any appropriate manner.

Figure 3:
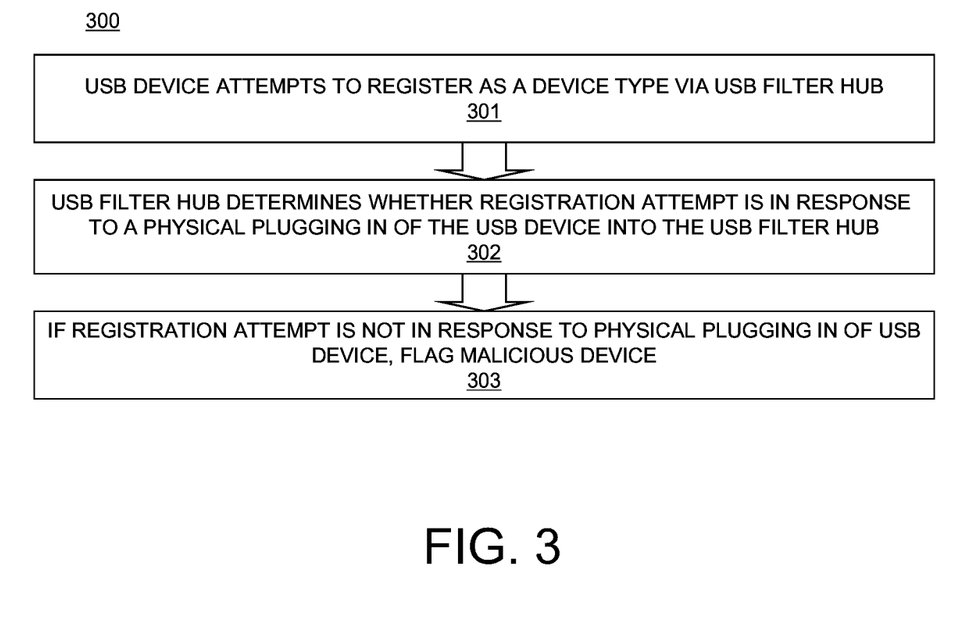
FIG. 3 depicts a process flow for detection of a malicious USB device in accordance with an embodiment.

FIG. 3 depicts a process 300 for detection of a malicious USB device during operation in accordance with an embodiment. First, in block 301, a registration attempt, including a device type, is received by USB filter hub 104 from a USB device 107A. Next, in block 302, the USB filter hub 104 determines whether the registration attempt that was received in block 301 was received in response to a physical plugging of the USB device 107A into the USB filter hub 104. In block 303, if it is determined that the registration attempt was not received in response to a physical plugging in of the USB device 107A into the USB filter hub 104, the USB device 107A is flagged as a malicious device.

Various mechanisms may be used in for distinguishing physical plug events in block 303 of FIG. 3. In some embodiments, the USB filter hub 104 may have physical plug detection capability. For example, an optical detector that is built into the USB filter hub 104 may sense when a USB device such as any of USB devices 107A-N is present or absent in the USB ports 105. In some embodiments, the USB ports 105 may each include a microswitch that is configured to detect a physical plug event. In some embodiments, plug event detection may also be done electrically, by, for example, splitting the hub ground connector and detecting whether there is continuity when a USB device is plugged in to a USB port of USB ports 105. In further embodiments, a USB device may have an independent power connection. In such an embodiment, powering up the device may appear as a plug event on the USB port that utilizes electrical detection. However, powering up the USB device won't be detectable as a physical plug or unplug event at the USB filter hub 104 (that is, the USB device connector will remain in place in the USB port). Therefore, in such embodiments, the user may be asked to confirm whether the device has had a plug event or if the device has merely been powered up. In some embodiments, power events may be detected by noting electrical behavior of the USB connector, also by asking for confirmation from the user. In further embodiments, a physical plug occurs when a device is not directly plugged directly into the hub, for example, there is a cable that interfaces between the device and the USB port on the USB filter hub 104. In such an embodiment, the device end of the cable may be disconnected, while leaving the other end connected to the USB filter hub 104. In such embodiments, this may not be detectable as a physical plug event at the hub, and requires user confirmation of the plug event. In some embodiments, the lock switch can be used to avoid asking the user for confirmation of such events as plug events. In further embodiments, any USB ports on the USB filter hub 104 that do not currently have any USB device connected to them may be deactivated upon setting of the lock switch 106.

Figure 4:
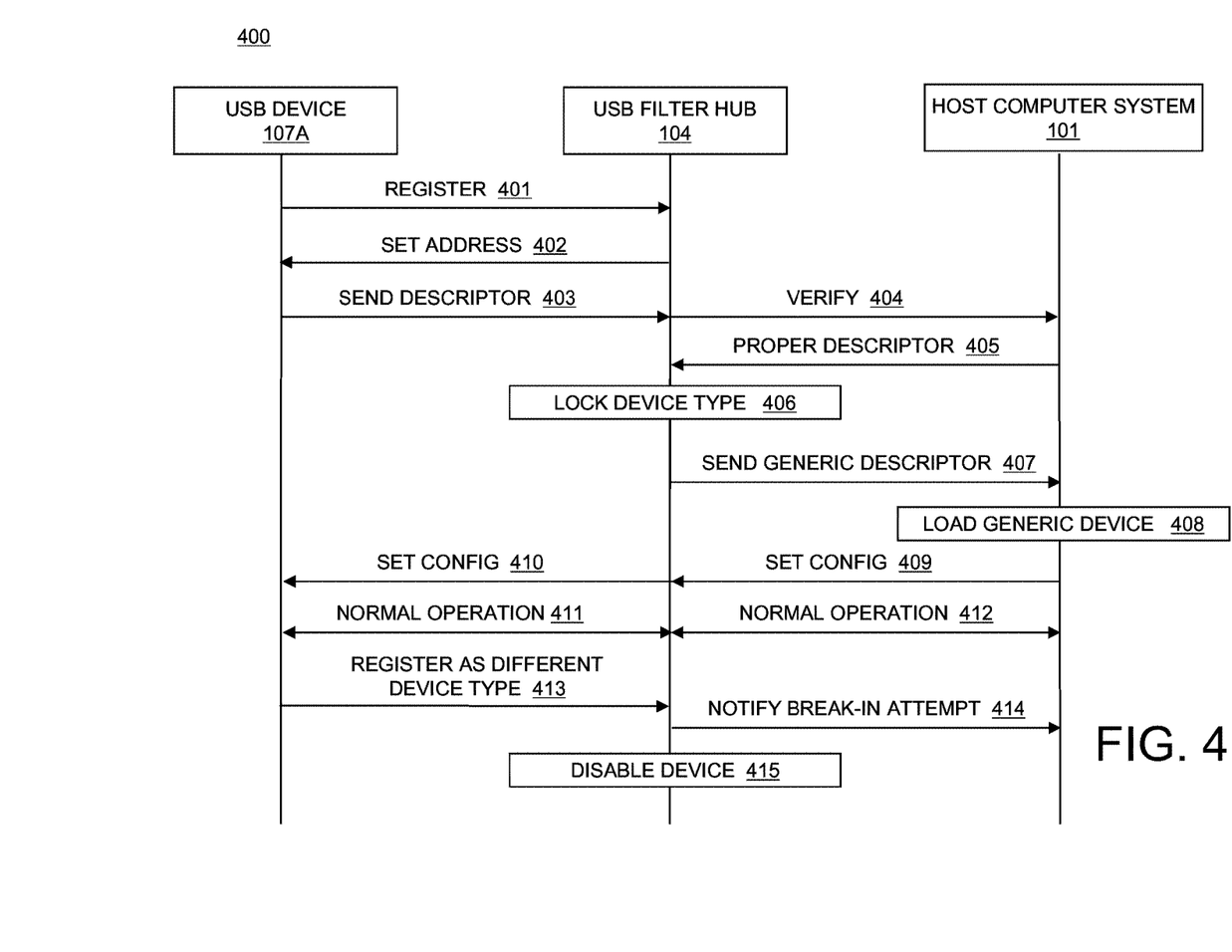
FIG. 4 depicts an example of communications between a USB device, a USB filter hub, and a host computer system in accordance with an embodiment.

FIG. 4 illustrates an example of communications between a malicious USB device 107A and a host computer system 101 via a USB filter hub 104 in accordance with methods 200 and 300 of FIGS. 2 and 3. The USB device 107A may comprise a flash drive with infected firmware that initially registers as a storage device, and then attempts to register as a keyboard. The user plugs the USB drive into the hub. The USB device 107A device initially registers with hub (401). The USB filter hub 104 sets the address for the USB device 107A (402), and the USB device 107A sends a descriptor including a device type to the USB filter hub 104 (403). The USB filter hub 104 then verifies that the device is allowed and expected for the device by communicating with the host computer system 101 (404 and 405). When the device type is verified by the host computer system 101, and the USB filter hub 104 locks the device type against further changes (406) and completes generic device USB device registration with the host computer system 101 (407 and 408). The configuration is set (409 and 410), and the USB device 107A then operates in normal mode, i.e., commands that are allowed for the device type are sent and received between the USB device 107A and the host computer system 101 (411 and 412). Then, during operation, the USB device 107A attempts to register as a different device type (for example, a keyboard device) in an attempt to infiltrate the host computer system 101 (413). This registration attempt is identified by the USB filter hub 104 as not being in response to a physical plugging in of the device into the USB filter hub 104, so the USB filter hub 104 notifies the host computer system 101 of the break-in attempt (414) and disables the USB device (415).

Figure 5:
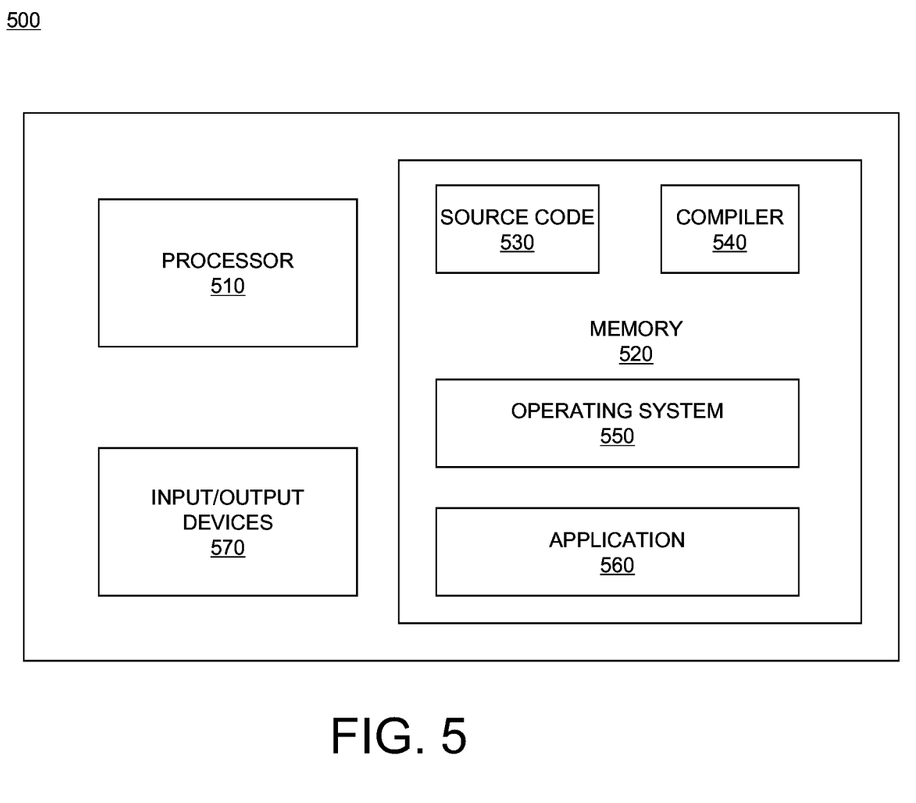
FIG. 5 depicts a computer system for use in conjunction with a USB filter hub in accordance with an embodiment.

FIG. 5 illustrates an example of a computer 500 which may be utilized in conjunction with various embodiments of a USB filter hub. Various operations discussed above may utilize the capabilities of the computer 500. One or more of the capabilities of the computer 500 may be incorporated in any element, module, application, and/or component discussed herein. For example, computer 500 may comprise host computer system 101, and a USB filter hub 104 may be connected to input/output (I/O) devices 570.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include protection of a computer system against malicious USB devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
   receiving, by a universal serial bus (USB) filter hub that is in communication with a host computer system, a connection from a USB device at a USB port of the USB filter hub;
   determining, by the USB filter hub, a type of the USB device;
   determining that the type of the USB device is valid;
   based on determining that the type of the USB device is valid, filtering commands that are communicated between the USB device and the host computer system via the USB filter hub based on a predetermined command set corresponding to the determined type of the USB device;
   intercepting, by the USB filter hub, a command from the USB storage device that is not part of the predetermined command set, such that the intercepted command is not transmitted to the host computer system;
   detecting a deregistration attempt by the USB device wherein the deregistration attempt comprises spoofing of a physical unplugging and plugging back in of the USB device, and wherein the detections comprises one of physical detection of the presence of the USB device in the USB port by an optical detector or a switch, and electrical detection of the presence of the USB device in the USB port based on continuity of a ground connection of the USB filter hub; and
   disabling the USB device based on at least one of the intercepted command and the deregistration attempt.

2. The method of claim 1, wherein determining that the type of the USB device is valid comprises checking a whitelist of permitted devices, wherein the whitelist comprises a list of permitted device types, and a respective permitted number of each permitted device type.

3. The method of claim 1, wherein determining that the type of the USB device is valid comprises receiving confirmation from a user of the host computer system that the type of the USB device is valid.

4. The method of claim 1, wherein the USB filter hub comprises a lock switch, and the method further comprises allowing booting of the host computer system from the USB device that is attached to the USB filter hub based on the lock switch.

5. The method of claim 1, wherein the USB filter hub is located internally to the host computer system.

6. The method of claim 1, wherein the USB filter hub is located externally to the host computer system and is connected to a USB port of the host computer system, and the method further comprises comprising disabling an additional USB port of the host computer system based on the USB filter hub being connected to the USB port.

7. A computer program product comprising:
   a computer readable storage medium having program instructions embodied therewith, the program instructions readable by a processing circuit to cause the processing circuit to perform a method comprising:
   receiving, by a universal serial bus (USB) filter hub that is in communication with a host computer system, a connection from a USB device at a USB port of the USB filter hub;
   determining, by the USB filter hub, a type of the USB device;
   determining that the type of the USB device is valid;
   based on determining that the type of the USB device is valid, filtering commands that are communicated between the USB device and the host computer system via the USB filter hub based on a predetermined command set corresponding to the determined type of the USB device;
   intercepting, by the USB filter hub, a command from the USB storage device that is not part of the predetermined command set, such that the intercepted command is not transmitted to the host computer system; and
   detecting a deregistration attempt by the USB device wherein the deregistration attempt comprises spoofing of a physical unplugging and plugging back in of the USB device, and wherein the detections comprises one of physical detection of the presence of the USB device in the USB port by an optical detector or a switch, and electrical detection of the presence of the USB device in the USB port based on continuity of a ground connection of the USB filter hub; and
   disabling the USB device based on at least one of the intercepted command and the deregistration attempt.

8. The computer program product of claim 7, wherein determining that the type of the USB device is valid comprises checking a whitelist of permitted devices, wherein the whitelist comprises a list of permitted device types, and a respective permitted number of each permitted device type.

9. The computer program product of claim 7, wherein determining that the type of the USB device is valid comprises receiving confirmation from a user of the host computer system that the type of the USB device is valid.

10. The computer program product of claim 7, wherein the USB filter hub comprises a lock switch, and further comprising allowing booting of the host computer system from the USB device that is attached to the USB filter hub based on the lock switch.

11. A universal serial bus (USB) filter hub comprising:
   a memory; and
   a processor, communicatively coupled to said memory, the computer system configured to perform a method comprising:
   receiving, by the USB filter hub that is in communication with a host computer system, a connection from a USB device at a USB port of the USB filter hub;
   determining, by the USB filter hub, a type of the USB device;
   determining whether the type of the USB device is valid;
   based on determining that the type of the USB device is valid, filtering commands that are communicated between the USB device and the host computer system via the USB filter hub based on a predetermined command set corresponding to the determined type of the USB device;
   intercepting, by the USB filter hub, a command from the USB storage device that is not part of the predetermined command set, such that the intercepted command is not transmitted to the host computer system; and
   detecting a deregistration attempt by the USB device wherein the deregistration attempt comprises spoofing of a physical unplugging and plugging back in of the USB device, and wherein the detections comprises one of physical detection of the presence of the USB device in the USB port by an optical detector or a switch, and electrical detection of the presence of the USB device in the USB port based on continuity of a ground connection of the USB filter hub; and disabling the USB device based on at least one of the intercepted command and the deregistration attempt.

12. The system of claim 11, wherein determining that the type of the USB device is valid comprises checking a whitelist of permitted devices, wherein the whitelist comprises a list of permitted device types, and a respective permitted number of each permitted device type.

13. The system of claim 11, wherein determining that the type of the USB device is valid comprises receiving confirmation from a user of the host computer system that the type of the USB device is valid.

* * * * *